(No Model.)

S. DARLING.
MEASURING RULE.

No. 371,741. Patented Oct. 18, 1887.

Witnesses
Chas. F. Schmelz.
Fred. B. Abbott.

Inventor
Samuel Darling
By his Attorney
S. Scholfield

UNITED STATES PATENT OFFICE.

SAMUEL DARLING, OF PROVIDENCE, RHODE ISLAND.

MEASURING-RULE.

SPECIFICATION forming part of Letters Patent No. 371,741, dated October 18, 1887.

Application filed June 11, 1887. Serial No. 241,073. (No model.)

*To all whom it may concern:*

Be it known that I, SAMUEL DARLING, a citizen of the United States, residing at Providence, in the State of Rhode Island, have invented a new and useful Improvement in Measuring-Rules, of which the following is a specification.

My invention consists in a measuring-rule graduated longitudinally from end to end at its corners, and having transverse end graduations, the fine divisions of which are not continued to either of the intersecting corners of the rule.

Figure 1:
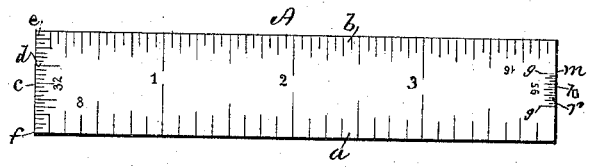
Figure 2:
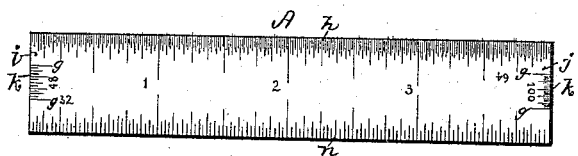

Figure 1 shows a view of one side of a measuring-rule provided with graduations embodying my improvement. Fig. 2 shows a view of the opposite side of the rule.

In the accompanying drawings, A is the measuring-rule provided at its opposite longitudinal edges with the graduated scales $a$ and $b$, and also made of a specific width; and, as represented in the drawings, the rule is four inches in length and three-quarters of an inch in width, the longitudinal graduations on one edge, $a$, being made to indicate eighths, and at the opposite edge, $b$, to indicate sixteenths, of an inch; and at the end $c$ is shown a transverse graduation, $d$, into thirty-seconds of an inch, which, being graduated equally from corner to corner of the rule, interferes with the longitudinal graduation $b$ at the corner $e$, so that one of the graduation-lines is omitted. The transverse graduation $d$ also intersects the graduation $a$ at the corner $f$. The end $m$ of the rule is divided into three equal parts by the two lines $g\ g$, thus graduating the end of the rule into spaces of one-quarter of an inch, and the central space, $k$, is subdivided into fourteen spaces, thus forming a scale, $r$, of fifty-sixths of an inch, which scale can be used for various useful purposes, as for measuring the threads of a screw and for setting a pair of dividers.

The opposite side of the rule is provided with the longitudinal scale $n$, of thirty-seconds of an inch, and the opposite scale, $h$, of sixty-fourths of an inch, and at one end is made the transverse graduation $i$, the width of the rule being divided into three equal parts by the lines $g\ g$, as before, and the middle division, $k$, subdivided into twelve equal parts, thus forming a scale of forty-eighths of an inch, the opposite end of the rule being provided with a transverse scale, $j$, which is also divided into quarter-inches by the lines $g\ g$, the middle division, $k$, being subdivided into twenty-five equal parts, thus forming a scale of hundredths of an inch.

The transverse scales $r$, $i$, and $j$ do not interfere with the adjacent longitudinal graduations, as in the case of the scale $d$, the end spaces of the graduations being left coarser than the intermediate spaces.

The rule may be made of any specific width which is capable of being divided into desirable graduations to form a transverse scale, the end spaces being left coarser in order to allow for the longitudinal scales.

I claim as my invention—

A measuring-rule of a specific width graduated at its opposite longitudinal edges, and having a transverse end graduation comprising both coarse and fine divisions, the coarse divisions being located at the intersections of the transverse and longitudinal scales, substantially as described.

SAML. DARLING.

Witnesses:
JOHN S. LYNCH,
SOCRATES SCHOLFIELD.